Dec. 1, 1931.    E. KOELLING ET AL    1,834,523
COMBINATION VEHICLE AND MOWER
Filed Feb. 7, 1927    3 Sheets-Sheet 1
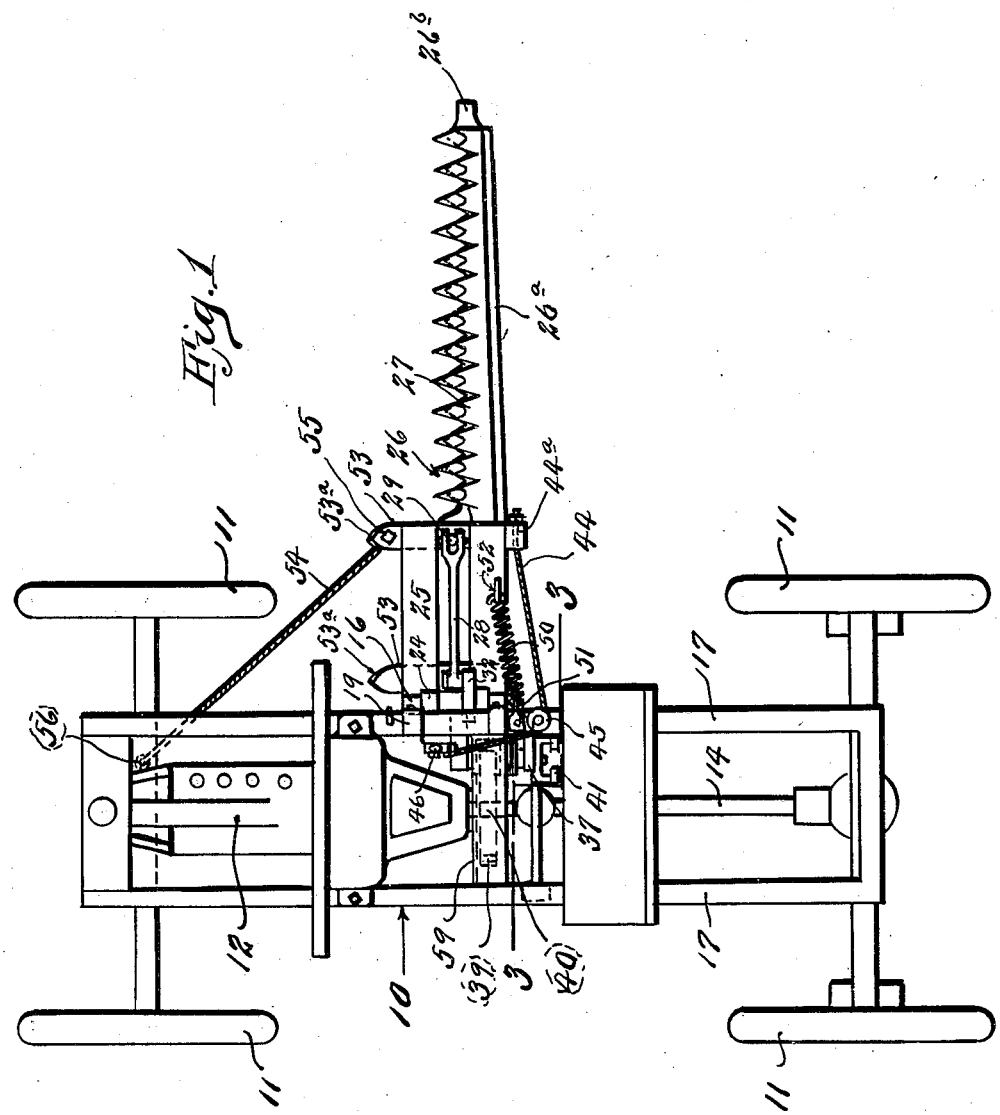
Inventors
Ed Koelling
Monroe Riek
Murray Tiffany
By Cornwall, Biddle & Janus Attys

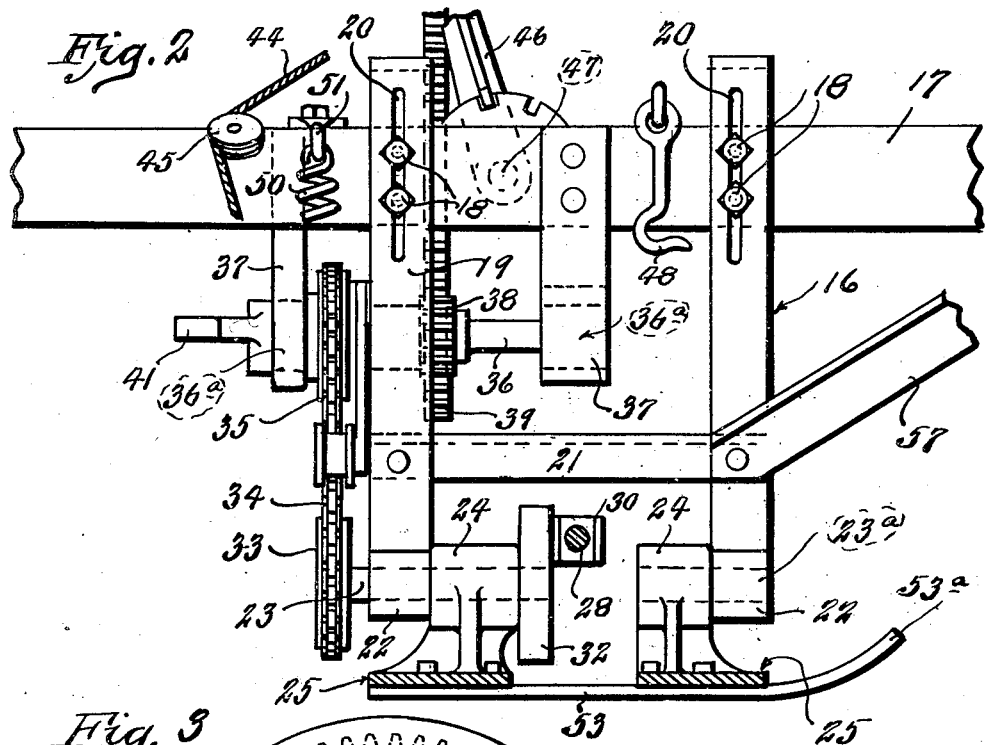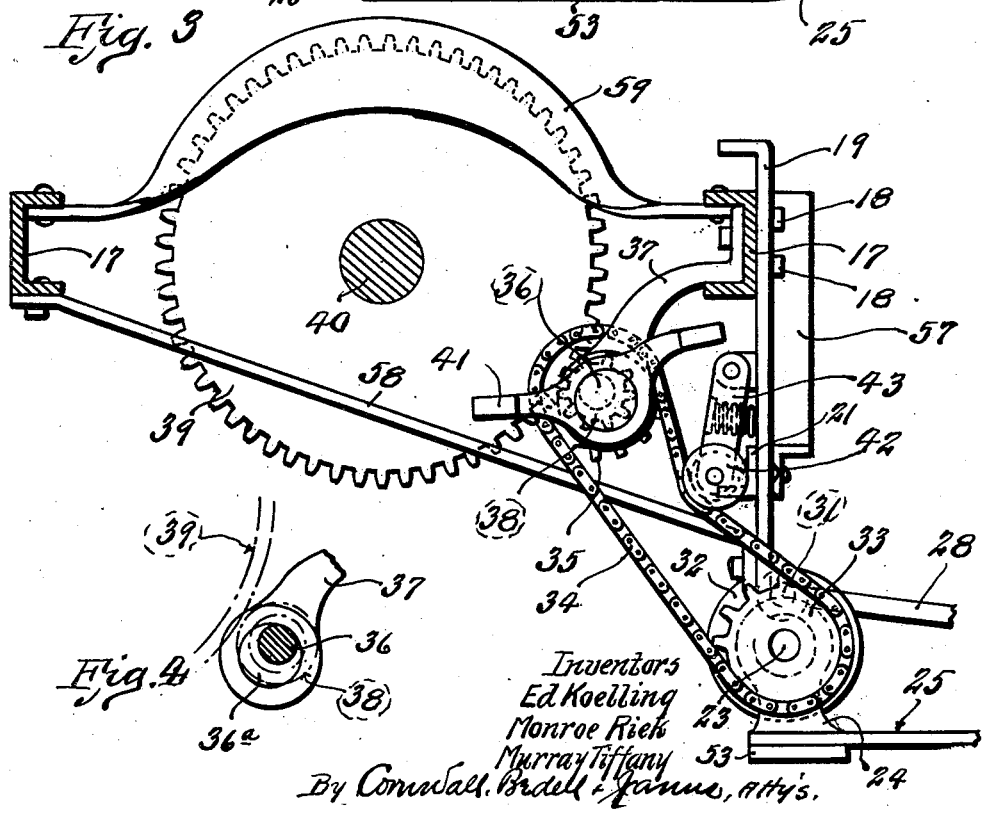

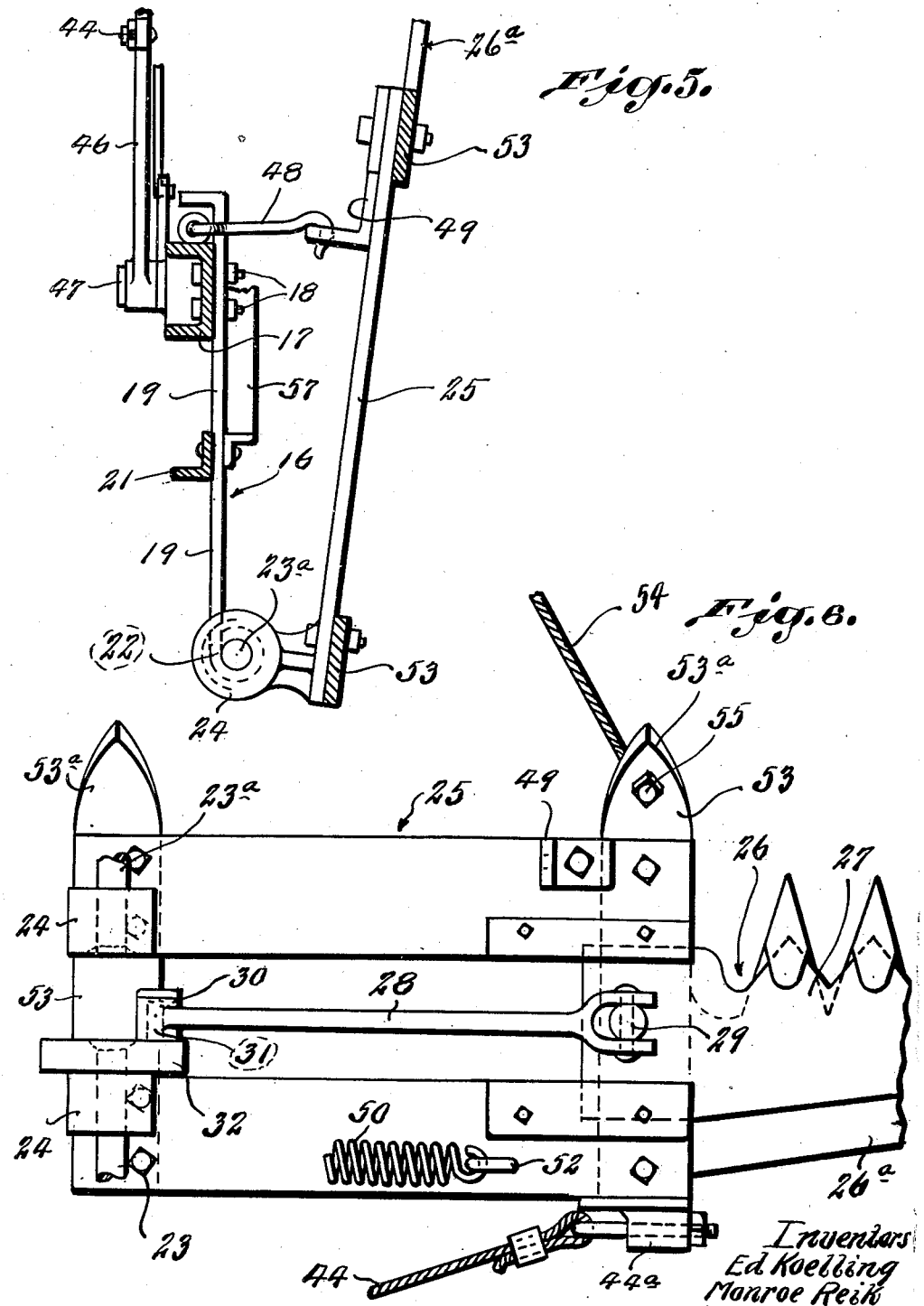

Patented Dec. 1, 1931

1,834,523

UNITED STATES PATENT OFFICE

ED KOELLING, OF MATSON, MONROE RIEK, OF AUGUSTA, AND MURRAY TIFFANY, OF MATSON, MISSOURI; SAID KOELLING AND SAID TIFFANY ASSIGNORS TO SAID RIEK

COMBINATION VEHICLE AND MOWER

Application filed February 7, 1927. Serial No. 166,549.

This invention relates to new and useful improvements in vehicle mowers, and the objects of the invention are to utilize a chassis of a vehicle and apply thereto a mowing attachment operable by the engine of said vehicle and movably mounted on one side of the chassis, said attachment being movable into laterally projecting position to mow grass and weeds growing alongside of the road or the right-of-way.

Further objects of the invention are to provide a mowing mechanism and operating connections therefor whereby said mowing mechanism can be operated by the engine of the vehicle to which said mowing mechanism is attached.

Still further objects of the invention are to provide means for moving said mowing mechanism upwardly toward the vehicle out of operating position to enable said vehicle to travel through congested places and over regular traffic lanes.

Other objects of the invention are to provide suitable tension means for supporting said mowing mechanism in extended operating position and permit easy manipulation of the mowing mechanism into inoperative position, and to provide means for locking said mechanism in upward inoperative position.

With these and other objects in view, our invention consists in certain novel features of construction and arrangement of parts, hereinafter more fully described and claimed, and illustrated in the accompanying drawings, in which—

Figure 1 is a top plan view of the combined vehicle and mower showing the mowing mechanism in extended or operative position.

Figure 2 is an elevational view of the mounting utilized to support the mowing mechanism on the chassis.

Figure 3 is a vertical cross section taken on line 3—3 of Figure 1.

Figure 4 is a detail view of the operating shaft.

Figure 5 is a fragmental sectional view showing the mowing mechanism moved upwardly into inoperative position.

Figure 6 is a top plan view of the supporting frame of the mowing mechanism and operating connections therefor.

In the present invention a mowing mechanism is mounted on the chassis of a vehicle of a well-known type and is operable into a laterally extending position so that as the vehicle is driven over the road the mowing mechanism which is operated from the drive shaft of the vehicle cuts the grass and weeds growing alongside of the road. As the vehicle can be operated at comparatively high speed, it is obvious that comparatively large territory can be operated upon by the mowing mechanism. The vehicle can be used on the right-of-way of railways to mow the grass and weeds on said right-of-way, thereby eliminating expensive manual labor heretofore used for this purpose.

Referring by numerals to the accompanying drawings, 10 indicates a vehicle chassis having wheels 11, an engine 12, and a drive shaft 14, the latter connecting the engine with the rear axle in the usual manner. A vertically disposed mounting 16 is secured to one of the side frames 17 of chassis 10 by means of fastening devices 18. This mounting 16 comprises a pair of vertically disposed members 19 having their upper ends provided with vertically disposed slots 20 for receiving fastening devices 18. By means of these slots, members 19 can be adjusted in vertical plane so as to control the distance of the mowing mechanism from the ground. Members 19 are tied together intermediate their ends by a cross-piece 21 and the lower ends of said members 19 terminate in bearings 22 for receiving horizontally disposed shafts 23 and 23ª, respectively. Pivotally supported on said shafts are bearings 24 of a frame 25 which latter forms a support for mowing mechanism 26. The latter is provided with a cutting blade 27 of usual construction which is mounted for reciprocating movement in extension 26ª and is operated by means of a connecting link 28. One end of this link is pivotally connected at 29 to blade 27 and the opposite end is connected at 30 to a crank pin 31, which latter is mounted on a disk 32 fixed to one end of shaft 23. The opposite end of this shaft projects beyond the corresponding bearing 22 and has fixed thereon a sprocket wheel 33 over which operates a sprocket chain 34. This sprocket chain passes over a sprocket wheel 35 loosely mounted on a shaft 36 a suitable distance above shaft 23 in bearings 37, which latter are fixed to said frame member 17.

A small pinion 38 is loosely arranged on shaft 36 and is conjoined to sprocket wheel 35. This pinion meshes with a large gear 39, which latter is fixed to a jack shaft 40 interposed between the drive shaft 14 and engine 12. Thus when the large gear 39 is actuated by the engine it operates pinion 38 which in turn drives by means of sprocket wheel 35 chain 34. The latter in passing over sprocket wheel 37 drives shaft 23 and causes reciprocation of cutting blade 27 of mowing mechanism 26. In order to permit disengagement of the mowing mechanism from the engine, shaft 36 is eccentrically mounted in bearings 37 as indicated at 36ª in Figure 4 and is operable by means of a treadle 41 to cause the pinion 38 to be moved into and out of mesh with large gear 39. An idler 42 is supported on one of the members 19 by a bracket 43 and bears against sprocket chain 34 so as to maintain the latter in proper taut position. Bracket 43 is preferably adjustable so as to provide for slight variations in the distance between shafts 23 and 36.

Frame 25 is movable into raised position by means of a cable 44 which operates over a sheave 45 arranged on said frame member 17 and said cable has one end secured to frame 25 as indicated at 44ª while the opposite end is attached to a handle 46 pivotally mounted at 47 to said frame member 17 and adapted to be locked in moved position in the usual manner. When frame 25 is raised, it is secured in this position by means of a hook 48 which is arranged on frame member 17 and is adapted to engage an aperture formed in a bracket 49, the latter being fixed to the frame 25.

To lower frame 25 and the mowing mechanism 26, hook 48 is disengaged and handle 47 is operated to release cable 44. In order to prevent a sudden release of frame 25 and mowing mechanism 26 a coiled spring 50 is provided and is anchored at one end to a hook 51 secured to frame member 17 and the opposite end is anchored by means of an eye-bolt 52 to frame 25. When the latter occupies extended position, spring 50 is stretched to a predetermined degree and the tension of this spring serves to counterbalance the weight of the mowing mechanism 26 when the latter is moved upwardly. This spring also serves as a shock absorber and prevents damage to frame 25 and parts supported thereby when said frame is suddenly released or when it strikes an obstruction during the travel of the vehicle.

The outer end of extension 26ª is provided with a shoe 26ᵇ which rides over the ground and supports said extension and allows said extension to move upwardly when passing over small obstructions, such as branches or small stones. Frame 25 is provided with transverse members 53 which are secured to the underside of said frame and have their front ends extended forwardly thereof and terminate in pointed and upwardly curved portions 53ª which serve to guide and protect the frame and mowing mechanism in the same manner as shoe 26ᵇ.

A cable 54 is fixed to the outer one of members 53 as indicated at 55 and extends diagonally under the chassis and has the opposite end secured preferably to the front axle at a point below the underframe as indicated at 56. This cable reinforces the frame 25 against lateral strains and prevents excessive strains from being applied to the bearings of the frame.

Mounting 16 is reinforced by an angle iron 57 which is secured at one end to the forward member 19 and extends forwardly at an angle to the side frame member 17 to which the opposite end of iron 57 is secured. A bar 58 has one end fixed to the other end of members 19 at a point below cross member 21 and extends inwardly thereof and transversely of the chassis and has its opposite end secured to the opposite frame member 17. In this manner the mounting 16 is reinforced against excessive stresses to which it is subjected due to the location of frame 25 and mowing mechanism 26 and is thus held securely in position. A guard 59 is placed over large gear 39 and is secured at its ends to the side frame members 17.

Mounting 16 is adjustable in a vertical plane so as to regulate the height of the mowing mechanism 26 with respect to the ground. Normally the mounting 16 is arranged so as to bring the mowing mechanism 16 high enough to enable it to pass over small stones, branches, and the like. In case of large stones, stumps, posts and similar objects, which are sufficiently large so that they may be observed by the operator in ample time, the operator, when passing such large objects, actuate handle 46 to raise frame 25 and mowing mechanism 26 into the position shown in Figure 5.

As the chassis 10 is of the usual vehicular construction, it can be operated at normal speeds over any roads or right-of-way without injury thereto. Thus the roads and right-of-ways can be kept clear of weeds at a comparatively low cost, as one man only is required to operate the combined vehicle and mower, and a large territory can be covered in a very short time. By the use of mounting 16, the mowing mechanism can be readily attached in position on the chassis and no structural changes are required in the latter. The mowing mechanism can be rendered inoperative immediately by operating treadle 41 to cause shaft 36 to move eccentrically and disengage pinion 38 from gear 39.

Our automobile mower can be manufactured at low cost as chassis of used cars may be utilized for this purpose and can be readily operated by anyone familiar with the operation of automobiles.

While we have shown and described the preferred form of our invention, it is obvious that changes can be made in the construction and arrangement of the driving connection between the mowing mechanism and the engine of the vehicle, and the means for supporting the mowing mechanism, without departing from the spirit of our invention.

We claim:

1. An automobile mower comprising in combination a vehicle chassis having channel side frame members, an automobile drive gear including a longitudinally disposed drive shaft, a rigid mounting fixed to one of said side frame members and extending downwardly therefrom, a horizontally disposed revoluble shaft journaled in the lower end of said mounting, a frame pivotally mounted on said mounting coaxially with said revoluble shaft, said fram being movable in a vertical plane about the axis of said revoluble shaft into a lateral operative position and a vertical inoperative position, a mowing mechanism carried by said frame, connections for raising and lowering said frame and said mowing mechanism, means for locking said frame in raised inoperative position, and a coil spring operatively connected to said chassis and frame and adapted to be tensioned to counterbalance the weight thereof when said mechanism occupies operative laterally extended position.

2. An automobile mower comprising in combination an automobile chassis having channel side frame members, a drive gear including a longitudinally disposed drive shaft, a rigid mounting fixed to one of said side frame members and extending downwardly therefrom, a frame pivotally mounted on the lower end of said mounting and movable in vertical plane into a lateral operative position and a vertical inoperative position, a mowing mechanism carried by said frame, a revoluble shaft journaled coaxially with the pivotal interengagement of said mounting and said frame and in parallelism with said drive shaft, operative connections between one end of said revoluble shaft and said mowing mechanism, a countershaft mounted in said chassis above the first shaft, driving connection between said counter shaft and said revoluble shaft, a driving member on said drive shaft, a driven member on said counter shaft, and means for shifting said driven member into and out of engagement with said driving member.

3. An automobile mower comprising in combination an automobile chassis including side frame members and having a standard drive gear including a longitudinally disposed drive shaft, a mounting secured to one of said side frame members and extending downwardly therefrom, a frame pivotally connected to the lower end of said mounting and swingable in a vertical plane into lateral operative position or vertical inoperative position, a mowing mechanism carried by said frame, a revoluble shaft mounted coaxially with the pivotal mounting of said frame, operative connections between said revoluble shaft and said mowing mechanism, a counter shaft arranged near said drive shaft and eccentrically mounted for movement relatively thereto, a chain drive arranged between said counter shaft and said revoluble shaft, a large gear fixed on said drive shaft, and a spur gear fixed on said counter shaft for meshing with said large gear, said spur gear being movable out of engagement with said drive shaft gear when said counter shaft is eccentrically displaced.

4. A mower comprising in combination a vehicle chassis having a driving mechanism including a drive shaft disposed longitudinally of said chassis, a mounting secured to one side of said chassis and depending therefrom, a frame pivotally supported by said mounting at a point below said chassis, and swingable in a vertical plane into either horizontal operative position or a vertical inoperative position, a mowing mechanism carried by said frame, a revoluble shaft journaled coaxially with the pivotal interengagement of said frame with said mounting, operating connections between one end of said revoluble shaft and said mowing mechanism, a revoluble member journaled in said chassis above said revoluble shaft, a chain drive between said revoluble member and said revoluble shaft, a driving gear fixed to said drive shaft, a pinion cooperating with said revoluble member and meshing with said driving gear, and means for moving said pinion into and out of said engagement with said driving gear to control the operation of said mowing mechanism.

In testimony whereof we hereunto affix our signatures February 2, 1927, January 25, 1927, and February 2, 1927, respectively.

ED KOELLING.
MONROE RIEK.
MURRAY TIFFANY.